(12) United States Patent
Nojima et al.

(10) Patent No.: US 12,577,461 B2
(45) Date of Patent: Mar. 17, 2026

(54) METHOD FOR PRODUCING QUANTUM DOTS

(71) Applicant: SHIN-ETSU CHEMICAL CO., LTD., Tokyo (JP)

(72) Inventors: Yoshihiro Nojima, Annaka (JP); Shinji Aoki, Annaka (JP); Kazuya Tobishima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 630 days.

(21) Appl. No.: 18/008,707

(22) PCT Filed: May 6, 2021

(86) PCT No.: PCT/JP2021/017322
§ 371 (c)(1),
(2) Date: Dec. 7, 2022

(87) PCT Pub. No.: WO2021/256109
PCT Pub. Date: Dec. 23, 2021

(65) Prior Publication Data
US 2023/0279293 A1 Sep. 7, 2023

(30) Foreign Application Priority Data

Jun. 15, 2020 (JP) ................................. 2020-102926

(51) Int. Cl.
| | |
|---|---|
| *C09K 11/77* | (2006.01) |
| *B82Y 40/00* | (2011.01) |
| *C01G 19/04* | (2006.01) |
| *B82Y 20/00* | (2011.01) |

(52) U.S. Cl.
CPC .......... *C09K 11/7719* (2013.01); *C01G 19/04* (2013.01); *B82Y 20/00* (2013.01); *B82Y 40/00* (2013.01); *C01P 2004/64* (2013.01)

(58) Field of Classification Search
CPC .. C09K 11/7719; C09K 11/772; C01G 19/04; B82Y 20/00; B82Y 40/00; C01P 2004/64
See application file for complete search history.

(56) References Cited

U.S. PATENT DOCUMENTS

| | | |
|---|---|---|
| 2012/0113672 A1 | 5/2012 | Dubrow et al. |
| 2017/0321119 A1 | 11/2017 | Hishiki |
| (Continued) | | |

FOREIGN PATENT DOCUMENTS

| | | |
|---|---|---|
| CN | 107500345 A | 12/2017 |
| CN | 109705849 A | 5/2019 |
| (Continued) | | |

OTHER PUBLICATIONS

Chou, Li-Hui, et al. "Scalable ultrasonic spray-processing technique for manufacturing large-area CH3NH3PbI3 perovskite solar cells." ACS applied materials & interfaces 10.44 (2018): 38042-38050.*

(Continued)

*Primary Examiner* — Richard M Rump
(74) *Attorney, Agent, or Firm* — Oliff PLC

(57) ABSTRACT

The present invention is a method for producing perovskite type quantum dots, wherein, using a plurality of precursor solutions each containing a different element, each of the plurality of precursor solutions is heated and sprayed as an aerosol of the precursor solution, and the plurality of aerosols are collided to cause a gas phase reaction, dropping in a solvent to synthesize core particles containing the different elements. This provides a method for producing quantum dots that enables control of the particle size and yields nanoparticles with a uniform particle size even in large-scale synthesis.

3 Claims, 3 Drawing Sheets

(56) References Cited

U.S. PATENT DOCUMENTS

| | | | |
|---|---|---|---|
| 2018/0208840 A1 | 7/2018 | Lüchinger et al. | |
| 2019/0148603 A1* | 5/2019 | Lotito | F21K 9/64 |
| | | | 362/362 |
| 2019/0362968 A1 | 11/2019 | Kosuda et al. | |
| 2021/0130687 A1 | 5/2021 | Lüchinger et al. | |
| 2022/0195295 A1 | 6/2022 | Lüchinger et al. | |

FOREIGN PATENT DOCUMENTS

| | | |
|---|---|---|
| CN | 111268685 A | 6/2020 |
| CN | 111909694 A | 11/2020 |
| JP | 2007-117937 A | 5/2007 |
| JP | 2013-544018 A | 12/2013 |
| KR | 10-2018-0022880 A | 3/2018 |
| WO | 2012/173262 A1 | 12/2012 |
| WO | 2016121792 A1 | 8/2016 |
| WO | 2018/139446 A1 | 8/2018 |
| WO | 2018/139447 A1 | 8/2018 |

OTHER PUBLICATIONS

Chang, Wei-Chieh, et al. "Controlled deposition and performance optimization of perovskite solar cells using ultrasonic spray-coating of photoactive layers." ChemSusChem 10.7 (2017): 1405-1412.*
Spray-Coated Colloidal Perovskite Quantum Dot Films for Highly Efficient Solar Cells.*
Dec. 13, 2022 International Preliminary Report on Patentability issued in International Application No. PCT/ JP2021/017322.
Murray C.B. et al; "Synthesis and Characterization of Nearly Monodisperse CdE (E=S, Se, Te) Semiconducter Nanocrystallites"; Journal of the American Chemical Society; 1993; vol. 115; pp. 8706-8715.
Protesescu, Loredana et al; "Nanocrystals of Cesium Lead Halide Perovskites (CsPbX$_3$, X = Cl, Br, and I): Novel Optoelectric Materials Showing Bright Emission with Wide Color Garnut"; Nano Letters; 2015; vol. 15; Issue 6; pp. 3692-3696.
Jack Li, J. et al; Large-Scale Synthesis of Nearly Monodisperse CdSe/CdS Core/Shell Nanocrystals Using Air-Stable Reagents via Successive Ion Layer Adsorption and Reaction; Journal of the American Chemical Society; 2003; vol. 125; Issue 41, pp. 12567-12575.
Jul. 20, 2021 International Search Report issued in International Patent Application No. PCT/JP2021/017322.
Jan. 18, 2024 Office Action issued in Chinese Patent Application No. 202180041886.2.
Jul. 16, 2024 Search Report issued in Chinese Patent Application No. 2021800418862.
Mar. 19, 2025 Office Action issued in Korean Patent Application No. 10-2022-7042737.

* cited by examiner

[FIG. 1]
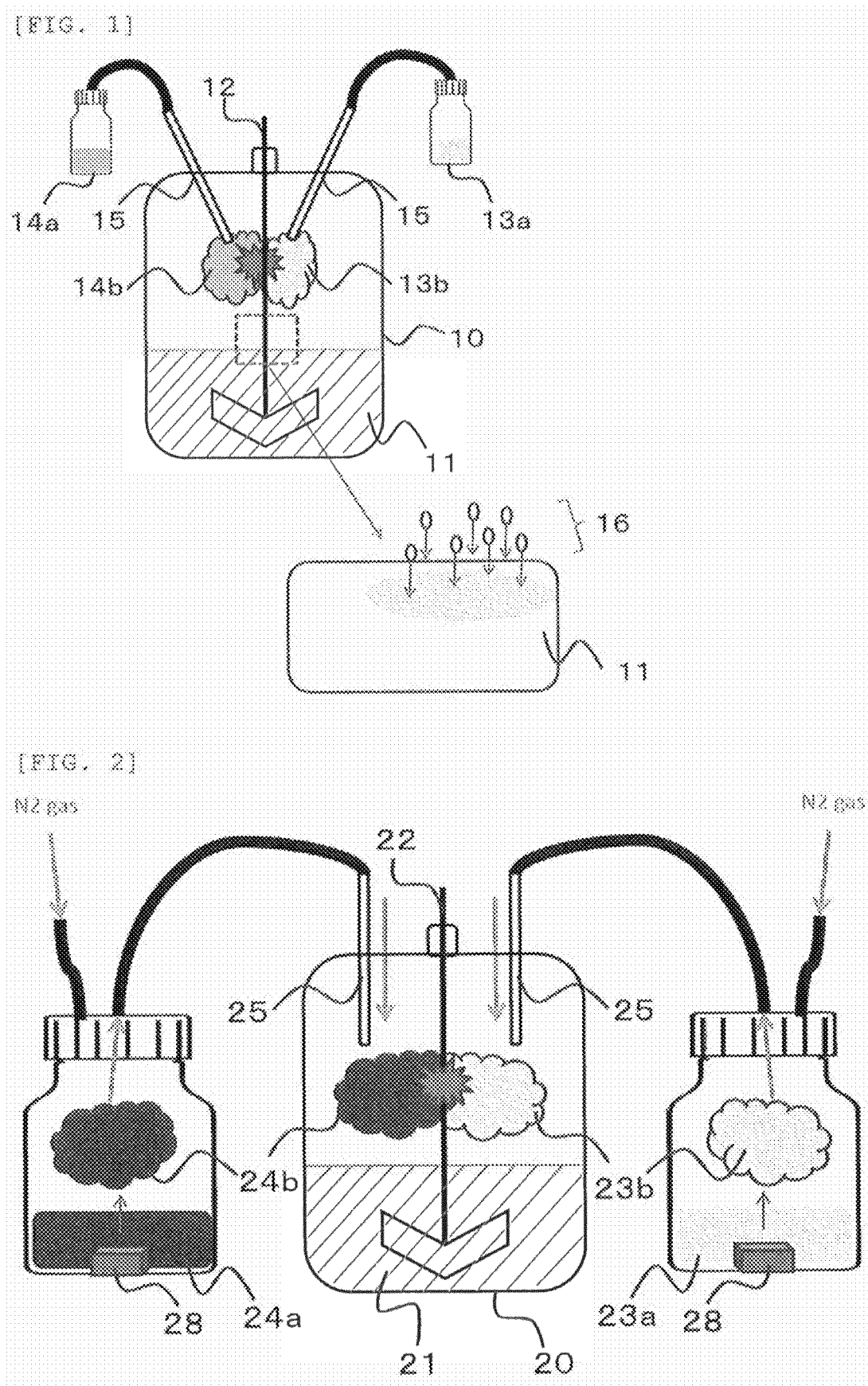
[FIG. 2]

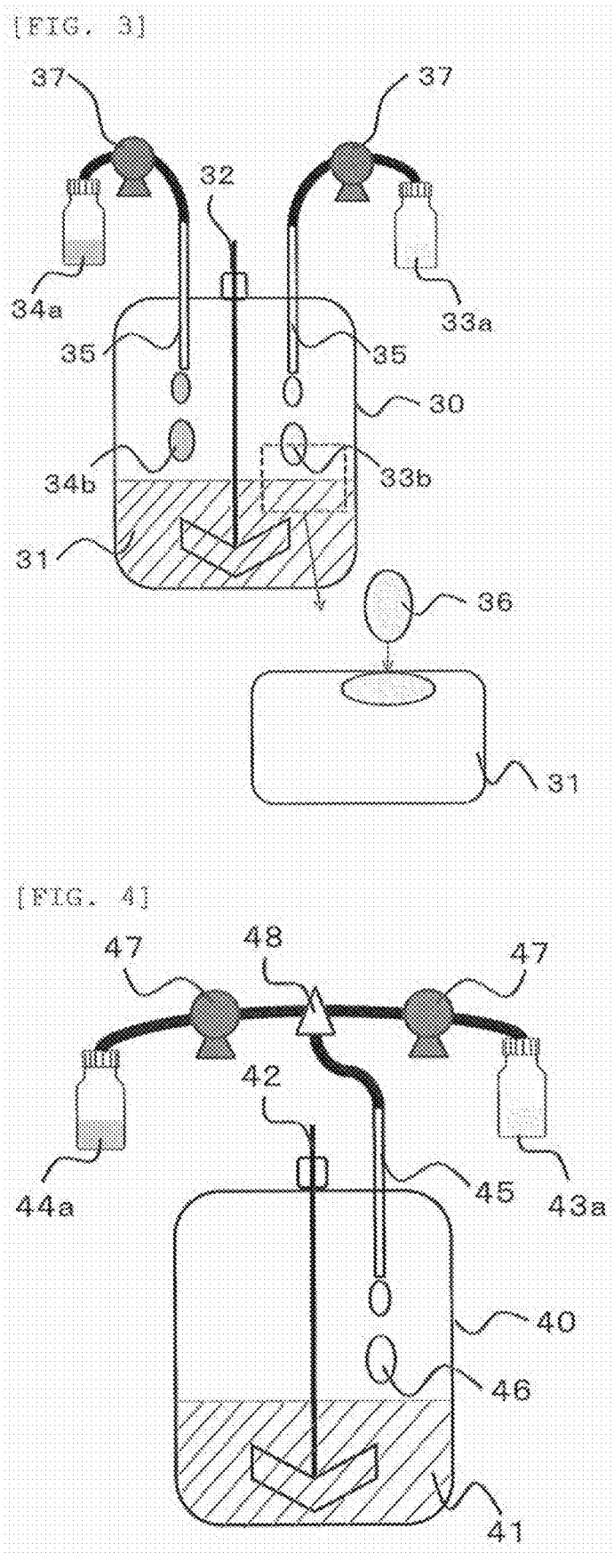

[FIG. 5]
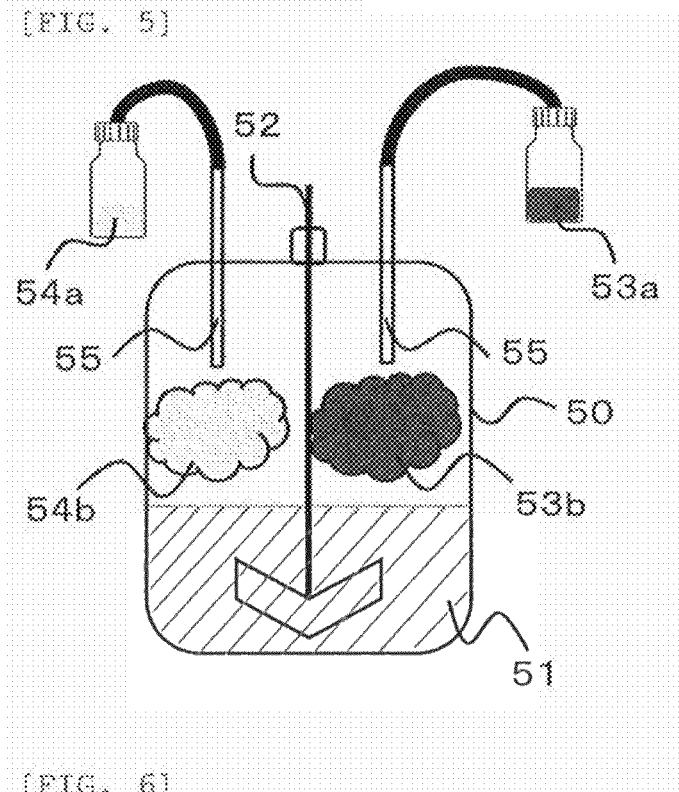
[FIG. 6]
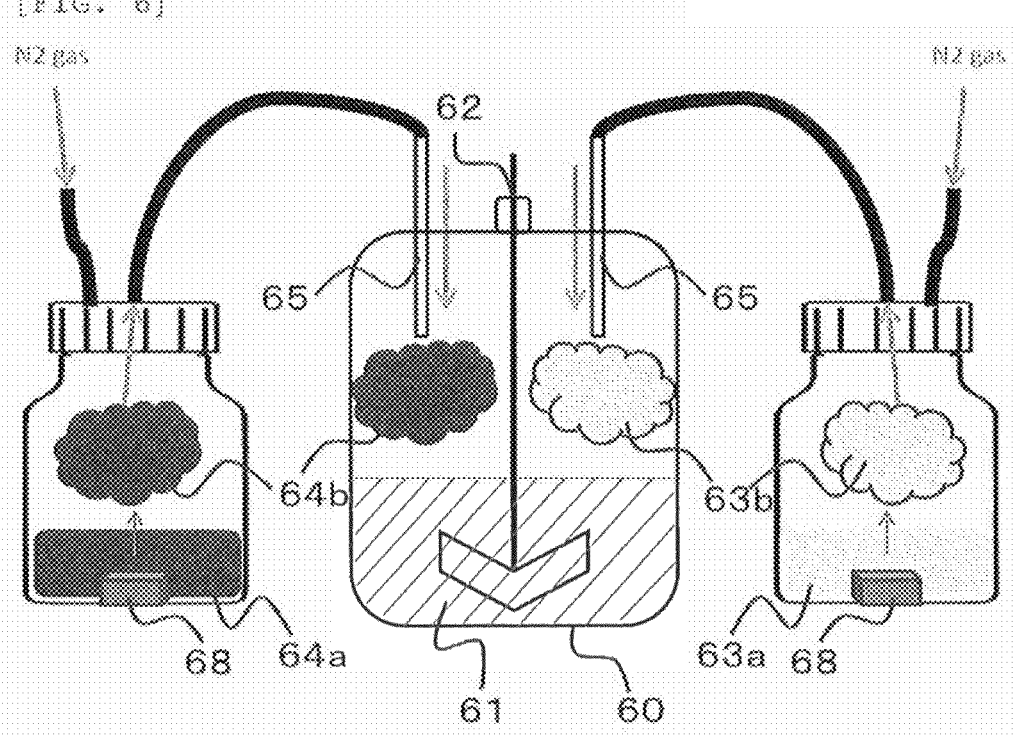

METHOD FOR PRODUCING QUANTUM DOTS

TECHNICAL FIELD

The present invention relates to a method for producing quantum dots.

BACKGROUND ART

Semiconductor crystal particles with nanosized particle diameter are called quantum dots, and excitons generated upon light absorption are confined in nanosized region, so that energy level of the semiconductor crystal particles becomes discrete Further, band gap changes depending on the particle size. Due to these effects, the fluorescence emission by quantum dots is brighter and more efficient than those by common fluorescent materials and exhibits sharp light emission.

Moreover, based on such nature that the band gap varies depending on the particle size, quantum dots are characterized in that the emission wavelength is controllable, and are expected to be applied as a wavelength conversion material for solid-state lighting and displays. For example, by using quantum dots as a wavelength conversion material in a display, it is possible to realize a wider color range and lower power Consumption than conventional fluorescent materials.

There is proposed a method for assembling quantum dots for use as a wavelength conversion material, in which quantum dots are dispersed in a resin material and a resin material containing the quantum dots is laminated with a transparent film, then the laminated film is incorporated into a backlight unit as a wavelength conversion film (Patent Document 1).

CITATION LIST

Patent Literature

Patent Document 1: JP 2013-544018 T

Non Patent Literature

Non Patent Document 1: Journal of the American Chemical Society, 1993, vol. 115, p. 8706-8715
Non Patent Document 2: Nano Letters 2015, Vol. 15, Issue 6, p 3692-3696
Non Patent Document 3: Journal of the American Chemical Society 2003, vol. 125, Issue 41, p 12567-12575

SUMMARY OF INVENTION

Technical Problem

However, there is a problem that particle size must be controlled in nanometer order in order to obtain desired wavelength, since band gap changes depending on particle size and emission wavelength shifts. Further, there is a problem that the light emission becomes broad due to particle size distribution. Quantum dots are generally synthesized as colloidal particles by reacting precursors in solution, but it is not easy to precisely control the particle size in nanometer size in solution reaction. Further, it becomes more difficult to control the particle size due to problems of precursor concentration unevenness and temperature distribution in the solution reaction, when scaled up for industrialization.

The hot injection method is used as a general method for synthesizing quantum dots. The hot injection method is a method for synthesizing colloidal particles having uniform particle size in nanometer order, due to homogeneous nucleation, by a precursor solution such as S, Se, P being quickly added to a solution of a precursor of a metal element such as Cd or In heated at a high temperature in an inert atmosphere (Non Patent Document 1).

However, the hot injection method can synthesize uniform nanometer order particles in flask-sized small scale synthesis, but in large scale synthesis of tens or hundreds of liters, the uniformity of the particle size of the nanoparticles deteriorates due to generation of local concentration unevenness at the time of charging the precursor solution Further, the local concentration unevenness increases according to the size of the synthesis scale, and the non-uniformity of the particle size becomes more problematic as the synthesis scale becomes larger.

In particular, as a general method for producing perovskite type quantum dots, the hot injection method is performed, followed by rapid cooling to stop the reaction and control the particle size (Non Patent Document 2). However, when the synthetic scale becomes large, rapid cooling from the heated state becomes difficult, making it more difficult to control the particle size.

The present invention has been made to solve the above problems, and an object of the present invention is to provide a method for producing quantum dots capable of obtaining uniform particle size nanoparticles in large scale synthesis while controlling the particle size with high accuracy.

Solution to Problem

The present invention has been made to achieve the above object, and provides a method for producing perovskite type quantum dots, wherein, using a plurality of precursor solutions each containing a different element, each of the plurality of precursor solutions is heated and sprayed as an aerosol of the precursor solution, and the plurality of aerosols are collided to cause a gas phase reaction, dropping in a solvent to synthesize core particles containing the different elements.

According to such a method for producing quantum dots, it becomes possible to obtain nanoparticles having a uniform particle size even in large scale synthesis while controlling the particle size with high accuracy.

At this time, the spraying is preferably performed using a single fluid nozzle or a two fluid nozzle.

According to such a spraying method, it becomes possible to obtain nanoparticles having a uniform particle size with higher accuracy even in large scale synthesis while controlling the particle size with higher accuracy.

At this time, the spraying is preferably performed by an ultrasonic method.

According to such a spraying method, it becomes possible to obtain nanoparticles having a uniform particle size with higher accuracy even in large scale synthesis while controlling the particle size with higher accuracy.

Advantageous Effects of Invention

As described above, according to the method for producing quantum dots of the present invention, nanoparticles having a uniform particle size can be obtained even in large scale synthesis while controlling the particle size with high accuracy. Moreover, this makes it possible to obtain quantum dots having a desired emission wavelength and a narrow emission wavelength distribution. Further, by using the quantum dots according to the present invention in wavelength conversion materials and image display devices, wavelength conversion materials and image display devices with good color reproducibility can be obtained.

BRIEF DESCRIPTION OF DRAWINGS

FIG. 1 is a diagram showing an example (Example 1) of an embodiment of the present invention;

FIG. 2 is a diagram showing an example (Example 2) of an embodiment of the present invention;

FIG. 3 is a diagram showing an apparatus for producing quantum dots used in Comparative Example 1;

FIG. 4 is a diagram showing an apparatus for producing quantum dots used in Comparative Example 2;

FIG. 5 is a diagram showing an apparatus for producing quantum dots used in Comparative Example 3;

FIG. 6 is a diagram showing an apparatus for producing quantum dots used in Comparative Example 4.

DESCRIPTION OF EMBODIMENTS

The present invention will be described in detail below, but the present invention is not limited to these.

As described above, there has been a problem of non-uniform particle size of quantum dots in large scale synthesis and an accompanying increase in the distribution of emission wavelengths. There has been a need for a method for producing quantum dots that can produce nanoparticles with a uniform particle size while controlling the particle size with high accuracy.

That is, as a result of intensive studies on the above problems, inventors of the present invention have found that by a method for producing perovskite type quantum dots, wherein, using a plurality of precursor solutions each containing a different element, each of the plurality of precursor solutions is heated and sprayed as an aerosol of the precursor solution, and the plurality of aerosols are collided to cause a gas phase reaction, dropping in a solvent to synthesize core particles containing the different elements, nanoparticles with a uniform particle size can be obtained even in large scale synthesis by controlling the particle size, and completed the present invention.

Quantum dots produced by the method for producing quantum dots according to the present invention are not particularly limited as long as they are of perovskite type, and may have a core-shell structure or may have a plurality of shells.

The composition of the quantum dots is not particularly limited, and can be appropriately selected according to the wavelength conversion material and optical element to be produced using the manufactured quantum dots.

As the composition of the perovskite type quantum dot core particles, $CsPbCl_3$, $CsPbBr_3$, $CaPbI_3$, $CH_3NH_3PbCl_3$, $CH_3NH_3PbBr_3$, $CH_3NH_3PbI_3$, $CsSnCl_3$, $CH_3NH_3SnCl_3$, $CsSnBr_3$, $CH_3NH_3SnBr_3$, $CaSnI_3$, $CH_3NH_3SnI_3$, $Cs_2TiCl_6$, $Cs_3TiBr_6$, $Cs_2TiI_6$, $CH_3NH_3Bi_2Cl_9$, $CH_3NH_3Bi_2Br_9$, $CH_3NH_3Bi_2I_9$, $Cs_2AgInCl_6$, $Cs_2AgInBr_6$, $Cs_2AgInI_6$, $Cs_2CuInCl_6$, $Cs_2CuInBr_6$, $Cs_2CuInI_6$, $Cs_2AgGaCl_6$, $Cs_2AgGaBr_5$, $Cs_2AgGaI_6$, $Cs_2CuGaCl_6$, $Cs_2CuGaBr_6$, $Cs_2CuGaI_6$ and mixed crystals thereof can be mentioned.

As examples of the composition of the perovskite type quantum dot shell layer, ZnSe, ZnS, AlP, AlN, GaN, $Ga_2S_3$, MgSe, and MgS can be mentioned. The shell layer may consist of one layer, or may consist of two or more layers, and can be appropriately changed according to the composition of the core particles and purpose. Also, the method for synthesizing the shell is not particularly limited and can be selected as appropriate. As examples of the shell synthesis method, the SILAR (Successive Ion Layer Adsorption and Reaction) method (Non Patent Document 3), in which shell precursor solutions of different elements are alternately dropped and reacted, can be mentioned.

The size and shape of the core particles and shell layer are not particularly limited, and can be appropriately selected according to the desired emission wavelength and characteristics. For example, the core particle can be 2-6 nm and the thickness of the shell layer can be 0.4-3 nm.

Furthermore, the surface of the perovskite type quantum dots may further have a coating layer of organic molecules, inorganic molecules, or polymers. In addition, the structure is not limited, and the thickness of the coating layer can be appropriately selected depending on the purpose. The thickness of the coating layer is not particularly limited, but it is desirable that the thickness is such that the particle size of the quantum dots is less than 100 nm. If the particle size of the quantum dots is less than 100 nm, the decrease in dispersibility and the accompanying decrease in optical transmittance and the occurrence of agglomeration are more effectively suppressed.

As the coating layer, organic molecules such as stearic acid, oleic acid, palmitic acid, dimercaptosuccinic acid, oleylamine, hexadecylamine, octadecylamine, 1-dodecanethiol, polymers such as polyvinyl alcohol, polyvinylpyrrolidone, polysilsesquioxane, polymethylmethacrylate, polyacrylonitrile and polyethylene glycol, and inorganic molecules such as silica, alumina, titania, zirconia, zinc oxide and gallium oxide can be exemplified.

Hereinafter, the method for producing quantum dots according to the present invention will be described with reference to the drawings.

FIG. 1 is a diagram showing an example of an embodiment of the present invention. FIG. 1 shows how core particles containing different elements are synthesized, that is a precursor solution 13*a* and a precursor solution 14*a* containing an element different from the precursor solution 13*a* are heated respectively, while a solvent 11 contained in the reaction vessel 10 is being stirred by the stirring rod 12, using fluid nozzles 15, spraying the aerosol 13*b* of the precursor solution 13*a* and the aerosol 14*b* of the precursor solution 14*a*, causing the aerosol 13*b* and the aerosol 14*b* to collide with each other to cause a gas phase reaction, and dripping into the solvent 11. In the example of FIG. 1, two types of precursor solutions are used as precursor solutions, each containing different elements, but more precursor solutions can be used in the method for producing quantum dots according to the present invention.

The lower part of FIG. 1 is an enlarged schematic diagram of the portion surrounded by the dotted line inside the reaction vessel 10. The precursor solutions 13*a* and 14*a* atomized by the fluid nozzles 15 react in the gas phase to form extremely fine droplets 16 and are dropped into the solvent 11. The solvent 11 stored in the reaction vessel 10 has a lower temperature than the heated precursor solutions 13*a* and 14*a*. In the method for producing quantum dots according to the present invention, the aerosols 13*b* and 14*b* react in the gas phase when they collide, and the reaction is terminated by being dropped into the solvent 11 in the reaction vessel 10 as droplets 16 and rapidly cooled.

When a plurality of precursor solutions are aerosolized and reacted in the gas phase as in the present invention, the precursor solutions become fine droplets, the total surface area of all the droplets increases, and the probability of collision between the solutions becomes higher. Reactivity is improved compared to the reaction in a solvent, and variations in the produced particles can be suppressed. Therefore, according to the method for producing quantum dots according to the present invention, the variation in the size of the generated particles is reduced, and nanoparticles with a uniform particle size can be obtained even in large scale synthesis while controlling the particle size with high accuracy.

Synthesis conditions such as temperature and concentration during the production of perovskite type quantum dots are not particularly limited, and can be appropriately selected according to the composition and desired emission characteristics. For example, the temperature of the solvent in the reaction vessel can be −10 to 20° C. Cooling to a temperature below room temperature is preferred. On the other hand, the temperature of the precursor solution to be sprayed can be 20 to 250° C., and the concentration can be 0.01 to 3.0 M (mol/L).

In the synthesis of core particles according to the present invention, in the method of spraying a plurality of heated precursor solutions each containing different elements and causing them to collide in an aerosol state to cause a gas phase reaction, the aerosol state is preferably a liquid colloid state of 800 μm or less. The size of the fine particles of the aerosol can be controlled by the spraying method and spraying conditions, and can be appropriately selected according to the desired properties of the quantum dots. The method of spraying in an aerosol state is not particularly limited, and can be selected according to the scale of the synthesis apparatus and the properties of the desired quantum dots.

As examples of the spraying method, a single fluid nozzle and a two fluid nozzle using an inert gas carrier can be mentioned. In particular, by using a two fluid nozzle, atomization performance is high, atomization can be performed at a relatively low pressure, and clogging of the nozzle is less likely to occur, which is preferable. Since the synthesis of quantum dots is generally performed in an inert gas atmosphere to exclude oxygen and moisture, it is preferable that the carrier gas is an inert gas. The type of inert gas can be freely selected, and as examples thereof, nitrogen and argon can be mentioned. The structure, spray pressure, and spray flow rate of the single fluid nozzle and two fluid nozzle are not particularly limited, and can be appropriately selected according to the properties and reaction conditions of the desired perovskite type quantum dots. Further, as a liquid supply method, there are a liquid pressurization method, a suction method, and the like, which can be appropriately selected according to the properties of the precursor solution. Further, the spray pattern of the nozzle may be fan-shaped, conical, or the like, but can be appropriately changed according to the synthesis scale, the reactivity of the precursor solution, and the like.

Another preferred atomization method is an ultrasonic atomization method. The ultrasonic atomization method includes a method in which the precursor solution is directly atomized by an ultrasonic nozzle, and a method in which the precursor solution is colloidized by ultrasonic atomization and the colloidal precursor is atomized by a carrier gas. The spraying method is not particularly limited, and can be selected according to the scale of the synthesizing apparatus and the desired properties of the quantum dots.

In addition, as the spraying method, a plurality of nozzles having the above method may be used, or different methods may be combined according to the precursor solution, and can be appropriately changed according to the scale of the synthesis apparatus and synthesis conditions.

Further, it is possible to provide a wavelength conversion material using quantum dots according to the present invention. As examples of the applications of the wavelength conversion material, such as a wavelength conversion film and a color filter can be mentioned, but the present invention is not limited to these applications. Due to the effect of the quantum dots according to the present invention, it is possible to obtain a wavelength conversion material having a target emission wavelength, good color reproducibility, and good luminous efficiency.

For example, by mixing the quantum dots according to the present invention with a resin, the quantum dots are dispersed in the resin, and further, by laminating the resin material, a wavelength conversion film containing the quantum dots according to the present invention can be obtained. In this step, quantum dots dispersed in a solvent can be added to the resin, mixed, and dispersed in the resin. Further, the solvent can be removed, and the powdered quantum dots can be added to the resin and kneaded to disperse the quantum dots in the resin. Alternatively, the monomers and oligomers that are the constituents of the resin can be polymerized in the coexistence of quantum dots. The method for dispersing the quantum dots in the resin is not particularly limited, and other than the illustrated method, an appropriate method can be selected according to the purpose.

The solvent for dispersing the quantum dots is not particularly limited as long as it is compatible with the resin used. Further, the resin material is not particularly limited, and a silicone resin, an acrylic resin, an epoxy resin, a urethane resin or the like can be appropriately selected according to desired characteristics. It is desirable that these resins have a high transmittance in order to increase the efficiency as a wavelength conversion material, and it is particularly desirable that the transmittance is 80% or more.

Further, the wavelength conversion material may contain a substance other than quantum dots, and may contain fine particles such as silica, zirconia, alumina, and titania as a light scattering body, and an inorganic fluorescent material or an organic fluorescent material may be included. As examples of the inorganic fluorescent material, YAG, LSN, LYSN, CASN, SCASN, KSE, CSO, β-SIALON, GYAG, LuAG, SBCA or the like, and organic fluorescent material, perylene derivative, anthraquinone derivative, anthracene derivative, phthalocyanine derivative, cyanine derivative, dioxazine derivative, benzoxazinone derivative, coumarin derivative, quinophthalone derivative, benzoxazole derivative, and pyrarizone derivative can be exemplified.

The method for producing the wavelength conversion material containing the quantum dots according to the present invention is not particularly limited, and can be appropriately selected depending on the intended purpose. For example, a wavelength conversion material can be obtained by applying a resin composition in which quantum dots according to the present invention are dispersed in a resin to a transparent film such as PET ox polyimide, curing the resin composition, and laminating the resin composition.

For coating on the transparent film, a spraying method such as spraying or inkjet, a spin coating or bar coater, a doctor blade method, a gravure printing method or an offset printing method can be used, and a resin layer can be formed by coating. Further, the thicknesses of the resin layer and the transparent film are not particularly limited and can be appropriately selected depending on the intended use.

As one of the embodiments of the quantum dots according to the present invention, there can be provided a backlight unit in which a wavelength conversion film containing the quantum dots according to the present invention is installed on a light guide panel surface coupled to a blue LED. Further, as one of the embodiments, it is also possible to provide an image display device in which a wavelength conversion film containing quantum dots according to the present invention is arranged between a light guide panel surface coupled to a blue LED and a liquid crystal display panel. In these embodiments, the wavelength conversion film containing the quantum dots according to the present invention absorbs at least a part of the blue light of the primary light as a light source and emits the secondary light having a wavelength longer than that of the primary light. Thereby, it can be converted into light having an arbitrary wavelength distribution depending on the emission wavelength of the quantum dot.

EXAMPLES

Hereinafter, the present invention will be described in detail with reference to examples, but these do not limit the present invention.

For the evaluation of the fluorescence emission characteristics of the quantum dots, the luminous properties were measured using a quantum efficiency measurement system (QE-2100 manufactured by Otsuka Electronics Co., Ltd.) with an excitation wavelength of 450 nm. In addition, the particle size of the droplets when the precursor solution was sprayed was shown as the average of the values measured by the laser Doppler method. Among the measured luminous properties of the quantum dots, the luminescence half value width reflects the particle size distribution, and it can be evaluated that the narrower the luminescence half value width, the more uniform the particle size distribution.

Example 1

In Example 1, quantum dots were produced using the apparatus shown in FIG. 1. 1.2 g of cesium carbonate and 0.4 mb of oleic acid were added to 5 L of 1-octadecene, and degassed at 150° C. for 60 minutes. After that, a cesium solution (precursor solution 13a) was prepared by setting the inside of the container to a nitrogen atmosphere.

Also, 1.5 g of lead bromide, 0.7 mb of oleic acid, and 0.7 mb of oleylamine were added to 6 L of 1-octadecene, and degassed at 50° C. for 60 minutes. After that, a lead bromide solution (precursor solution 14a) was prepared by setting the inside of the container to a nitrogen atmosphere.

12 L of 1-octadecene (solvent 11) was placed in a 50 L reaction vessel 10 and maintained at 10° C. The cesium solution (precursor solution 13a) and the lead bromide solution (precursor solution 14a) were heated to 200° C. in the reaction vessel 10 and were sprayed so as to collide with each other by separate fan shaped single fluid nozzles 15, and the aerosols 13b and 14b were respectively made to react in the gas phase, and then dropped into 12 L of 1-octadecene (solvent 11) being stirred by the stirring rod 12. The spraying conditions were a nitrogen gas pressure of 0.05 MPa and a spray flow rate of about 1 L/min. The average particle size of the droplets at this time was about 220 μm.

5 times by volume of acetone was added to the quantum dot solution after the reaction to precipitate the quantum dots, and a centrifuge was used to perform centrifugation at 10000 rpm (min$^{-1}$) for 10 minutes, and the recovered precipitate was redistributed in toluene. The quantum dots were purified.

As a result of measuring the luminous properties of the CsPbBr$_3$ quantum dots obtained by the above process, the emission wavelength was 539 nm, the emission half value width was 27 nm, and the internal quantum efficiency was 82%.

Comparative Example 1

FIG. 3 is a diagram showing an apparatus for producing quantum dots used in Comparative Example 1. 1.2 g of cesium carbonate and 0.4 L of oleic acid were added to 5 L of 1-octadecene, and degassed at 150° C. for 60 minutes. After that, the inside of the container was made to have a nitrogen atmosphere, and a cesium solution (precursor solution 33a) was prepared.

Also, 1.5 g of lead bromide, 0.7 L of oleic acid, and 0.7 L of oleylamine were added to 6 L of 1-octadecene, and degassed at 50° C. for 60 minutes. After that, a lead bromide solution (precursor solution 34a) was prepared by setting the inside of the container to a nitrogen atmosphere.

12 L of 1-octadecene (solvent 31) was placed in a 50 L reaction vessel 30 and maintained at 200° C. The Cesium solution (precursor solution 33a) and the lead bromide solution (precursor solution 34a) were sent into the reaction vessel 30 by plunger pumps 37, and the cesium solution (precursor solution 33a) and the lead bromide solution (precursor solution 34a) were dropped as droplets 33b and 34b from separate dropping nozzles 35 into the solvent 31 being stirred by the stirring rod 32 in the reaction vessel 30, respectively. At this time, the flow rate was about 0.8 L/min. After completion of dropping, the solution in reaction vessel 30 was cooled to room temperature. The lower part of FIG. 3 is an enlarged schematic diagram of the portion surrounded by the dotted line inside the reaction vessel 30. The precursor solutions were dropped as droplets 36 into the solvent 31 by dropping nozzles 35.

5 times by volume of acetone was added to the quantum dot solution after the reaction to precipitate the quantum dots, and a centrifuge was used to perform centrifugation at 10000 rpm (min$^{-1}$) for 10 minutes, and the recovered precipitate was redistributed in toluene. The quantum dots were purified.

As a result of measuring the luminous properties of the CsPbBr$_3$ quantum dots obtained by the above process, the emission wavelength was 550 nm, the emission half value width was 41 nm, and the internal quantum efficiency was 53%. As described above, the quantum dots produced by reacting a plurality of precursor solutions in the heated solvent had a larger half valve width than that of Example 1.

Comparative Example 2

FIG. 4 is a diagram showing an apparatus for producing quantum dots used in Comparative Example 2. 1.2 g of cesium carbonate and 0.4 L of oleic acid were added to 5 L of 1-octadecene, and degassed at 150° C. for 60 minutes, After that, the inside of the container was made to have a nitrogen atmosphere, and a cesium solution (precursor solution 43a) was prepared.

Also, 1.5 g of lead bromide, 0.7 L of oleic acid, and 0.7 L of oleylamine were added to 6 L of 1-octadecene, and degassed at 50° C. for 60 minutes. After that, a lead bromide solution (precursor solution 44a) was prepared by setting the inside of the container to a nitrogen atmosphere.

12 L of 1-octadecene (solvent 41) was placed in a 50 L reaction vessel 40 and maintained at 10° C. The cesium solution (precursor solution 43a) and the lead bromide solution (precursor solution 44a) heated to 200° C. were fed into the reaction vessel 40 by plunger pumps 47 respectively, and then mixed by a T-shaped mixer 48. After the two liquids were mixed, they were dropped as droplets 46 from the dropping nozzle 45 into the solvent 41 being stirred by the stirring rod 42 in the reaction vessel 40. At this time, the flow rate was about 0.8 L/min. After dropping, the solution in reaction vessel 40 was cooled to room temperature.

5 times by volume of acetone was added to the quantum dot solution after the reaction to precipitate the quantum dots, and a centrifuge was used to perform centrifugation at 10000 rpm (min$^{-1}$) for 10 minutes, and the recovered precipitate was redistributed in toluene. The quantum dots were purified.

As a result of measuring the luminous properties of the CsPbBr$_3$ quantum dots obtained by the above process, the emission wavelength was 543 nm, the emission half value width was 38 om, and the internal quantum efficiency was 80%. Thus, the quantum dots produced by reacting a plurality of precursor solutions in advance and then cooling them as droplets had a larger half value width than in Example 1.

Comparative Example 3

FIG. 5 is a diagram showing an apparatus for producing quantum dots used in Comparative Example 3. 1.2 g of cesium carbonate and 0.4 mb of oleic acid were added to 5 L of 1-octadecene, and degassed at 150° C. for 60 minutes. After that, the inside of the container was made to have a nitrogen atmosphere, and a cesium solution (precursor solution 53a) was prepared.

Also, 1.5 g of lead bromide, 0.7 mL of oleic acid, and 0.7 mL of oleylamine were added to 6 L of 1-octadecene, and degassed at 50° C. for 60 minutes. After that, a lead bromide solution (precursor solution 54a) was prepared by setting the inside of the container to a nitrogen atmosphere.

12 L of 1-octadecene (solvent 51) was placed in a 50 L reaction vessel 50 and maintained at 200° C. The cesium solution (precursor solution 53a) and the lead bromide solution (precursor solution 54a) were sprayed into the reaction vessel 50 by separate fan shaped single fluid nozzles 55 so that the droplets do not collide with each other, and each aerosol was obtained. The aerosol 53b and 54b were added dropwise and reacted in a solvent 51 while stirring with a stirring rod 52. The spraying conditions were a nitrogen gas pressure of 0.05 MPa and a spray flow rate of about 1 L/min, and the average particle diameter of the droplets was about 220 μm. After spraying, the solution in reaction vessel 50 was cooled to room temperature.

5 times by volume of acetone was added to the quantum dot solution after the reaction to precipitate the quantum dots, and a centrifuge was used to perform centrifugation at 10000 rpm (min$^{-1}$) for 10 minutes, and the recovered precipitate was redistributed in toluene. The quantum dots were purified.

As a result of measuring the luminous properties of the CsPbBr$_3$ quantum dots obtained by the above process, the emission wavelength was 542 nm, the emission half value width was 36 nm, and the internal quantum efficiency was 778. Thus, the quantum dots produced by reacting a plurality of aerosolized precursor solutions in a heated solvent had a larger half value width than that of Example 1.

Example 2

FIG. 2 is a diagram showing an apparatus for producing quantum dots used in Example 2. 2.4 g of cesium bromide and 0.5 mb of oleic acid were put into 8 L of 1-octadecene and degassed at 150° C. for 60 minutes to prepare a cesium solution (precursor solution 23a), After that, the inside of the sealed container equipped with the 2.4 MHz ultrasonic atomization unit 28 was replaced with nitrogen, and the cesium solution (precursor solution 23a) was put into the container under in atmosphere.

In addition, 2.2 g of tin (II) bromide, 1.0 ml of oleic acid, and 1.0 ml of oleylamine were added to 8 L of 1-octadecene, degassed at 50° C. for 60 minutes, and the tin (II) bromide solution (precursor solution 24a) was prepared. After that, the inside of the sealed container equipped with the 2.4 MHz ultrasonic atomization unit 28 was replaced with nitrogen, and the tin (II) bromide solution (precursor solution 24a) was put into the container in nitrogen atmosphere.

16 L of 1-octadecene (solvent 21) was placed in a 50 L reaction vessel 20 and maintained at 10° C. The cesium solution (precursor solution 23a) and the tin (II) bromide solution (precursor solution 24a) were heated to 200° C. in the reaction vessel 20, and atomized by separate ultrasonic atomization units 28 into aerosols 23b and 24b, respectively. The aerosols 23b and 24b were fed into the reaction vessel 20 using nitrogen gas as a carrier, and the aerosols 23b and 24b were sprayed from the spray nozzles 25 so that droplets of the aerosols 23b and 24b collide with each other, and the aerosols 23b and 24b were made to react in the gas phase, and then dropped into solvent 21 being stirred by the stirring rod 22. The spraying conditions were a nitrogen gas pressure of 0.05 MPa and a spray flow rate of about 1 L/min. The average particle size of the droplets at this time was about 220 μm.

5 times by volume of acetone was added to the quantum dot solution after the reaction to precipitate the quantum dots, and a centrifuge was used to perform centrifugation at 10000 rpm (min$^{-1}$) for 10 minutes, and the recovered precipitate was redistributed in toluene. The quantum dots were purified.

As a result of measuring the luminous properties of the CsSnBr$_3$ quantum dots obtained by the above process, the emission wavelength was 537 nm, the emission half value width was 35 nm, and the internal quantum efficiency was 71%.

Comparative Example 1

FIG. 6 is a diagram showing an apparatus for manufacturing quantum dots used in Comparative Example 4. 2.4 g of cesium bromide and 0.5 mL of oleylamine were put into 8 L of 1-octadecene and degassed at 150° C. for 60 minutes to prepare a cesium solution (precursor solution 63a). After that, the inside of the sealed container equipped with the 2.4 MHz ultrasonic atomization unit 68 was replaced with nitrogen, and the cesium solution (precursor solution 63a) was introduced into the container in nitrogen atmosphere.

2.2 g of tin bromide, 1.0 mb of oleic acid, and 1.0 mL of oleylamine were added to 8 L of 1-octadecene, and degassed at 50° C. for 60 minutes to obtain a tin (II) bromide solution (precursor solution 64a). After that, the inside of the sealed container equipped with the 2.4 MHz ultrasonic atomization unit 68 was replaced with nitrogen, and the tin (II) bromide solution (precursor solution 64a) was put into the container in nitrogen atmosphere.

16 L of 1-octadecene (solvent 61) was placed in a 50 L reaction vessel 60 and maintained at 220° C. The cesium solution (precursor solution 63a) and the tin (II) bromide solution (precursor solution 64a) were heated to 200° C. in the reaction vessel 60 and atomized by separate ultrasonic atomization units 68 into aerosol states 63b and 64b, respectively. Using nitrogen gas as a carrier gas, aerosols 63b and 64b were sent into the reaction vessel 60, and the aerosols 63b and 64b were sprayed from the spray nozzle 65 so that droplets did not collide with each other. They were added dropwise and reacted in solvent 61 being stirred by the stirring rod 62. As for the both spray conditions, the spray flow rate was set to about 0.2 L/min. The average particle size of the droplets at this time was about 5 $\mu$m. The sprayed solution was cooled to room temperature.

5 times by volume of acetone was added to the quantum dot solution after the reaction to precipitate the quantum dots, and a centrifuge was used to perform centrifugation at 10000 rpm ($min^{-1}$) for 10 minutes, and the recovered precipitate was redistributed in toluene. The quantum dots were purified.

As a result of measuring the luminous properties of the $CaSnBr_3$ quantum dots obtained by the above process, the emission wavelength was 544 nm, the emission half value width was 49 nm, and the internal quantum efficiency was 618. Thus, the quantum dots produced by reacting a plurality of aerosolized precursor solutions in a heated solvent had a larger half value width than that of Example 2.

From the results of the above examples and comparative examples, it was found that when synthesizing perovskite type quantum dots, multiple heated precursor solutions containing different elements are sprayed, collided in an aerosol state to cause a gas phase reaction, and dropped into a solvent, the particle size of the quantum dots can be uniformly controlled even when scaled up, and the increase in the half value width of the emission can be suppressed.

The present invention is not limited to the above embodiment. The above-described embodiment is an example, and any examples having substantially the same structure as the technical idea described in the claims of the present invention and having the same effect is included in the technical scope of the present invention.

The invention claimed is:

1. A method for producing perovskite type quantum dots, wherein,
   using a plurality of precursor solutions each containing a different element, each of the plurality of precursor solutions is heated and sprayed as an aerosol of the precursor solution, and the plurality of aerosols are collided to cause a gas phase reaction, dropping in a solvent to terminate the gas phase reaction and synthesize core particles containing the different elements, wherein a temperature of the solvent is −10° C. to 20° C. and wherein the temperature of the solvent is lower than a temperature of the precursor solution.

2. The method for producing quantum dots according to claim 1, wherein the spraying is performed using a single fluid nozzle or a two fluid nozzle.

3. The method for producing quantum dots according to claim 1, wherein the spraying is performed by an ultrasonic method.

* * * * *